United States Patent [19]

Bonfils

[11] Patent Number: 4,685,338
[45] Date of Patent: Aug. 11, 1987

[54] DEVICE FOR MOUNTING A RELATIVE DISPLACEMENT SENSOR ON A BEAM HAVING RADIAL LUGS

[75] Inventor: Georges L. A. Bonfils, La Chevraliere, France

[73] Assignee: S.F.E.N.A., S.A., Velizy Villacoublay, France

[21] Appl. No.: 896,726

[22] Filed: Aug. 15, 1986

[30] Foreign Application Priority Data

Aug. 27, 1985 [FR] France ............... 85 12760

[51] Int. Cl.$^4$ .......................... G01L 1/04; G01L 1/00
[52] U.S. Cl. .................................. 73/862.62; 73/782
[58] Field of Search ............... 73/763, 767, 773, 774, 73/775, 781, 782, 786, 794, 795, 802, 841, 842, 779, 862.62, 862.04, 862.65, 862.66, 862.68, 862.69, 862.54, 855; 177/132, 136

[56] References Cited

U.S. PATENT DOCUMENTS

| 2,722,587 | 11/1955 | Buzzetti et al. | 73/802 |
| 3,390,575 | 7/1967 | Nukle | 73/781 |
| 3,780,817 | 12/1973 | Videon | 73/767 |
| 4,086,576 | 4/1978 | Jebb et al. | 73/767 |
| 4,269,070 | 5/1981 | Nelson et al. | 73/779 |
| 4,472,976 | 9/1984 | Bonfils | 73/862.62 |

FOREIGN PATENT DOCUMENTS 8209243 5/1982 France .

Primary Examiner—Stewart J. Levy
Assistant Examiner—Robert R. Raevis
Attorney, Agent, or Firm—McAulay, Fields, Fisher, Goldstein & Nissen

[57] ABSTRACT

The device comprises at least three non-colinear studs (A,B,C) interposed between each lug face (5) against which a sensor or sensor mounting part is pressed. Stud (A) may be closer to a beam (1) than the other studs (b) and (C), thereby maximizing the relative displacement of the sensor parts for a given shear force on the beam (1).

16 Claims, 12 Drawing Figures

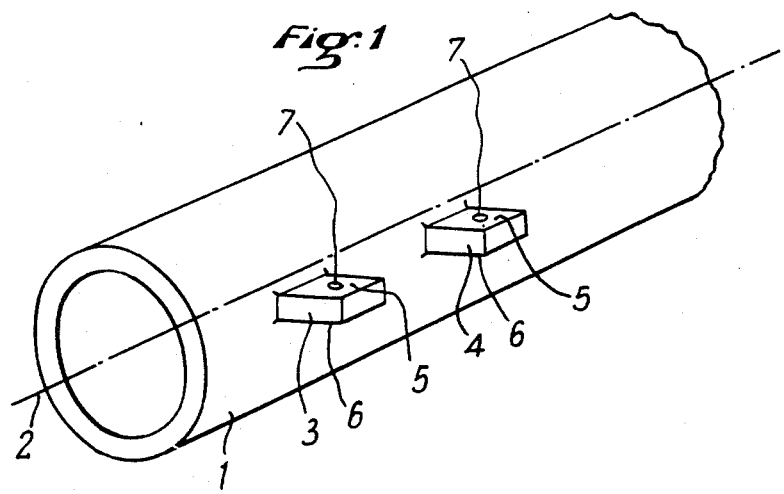
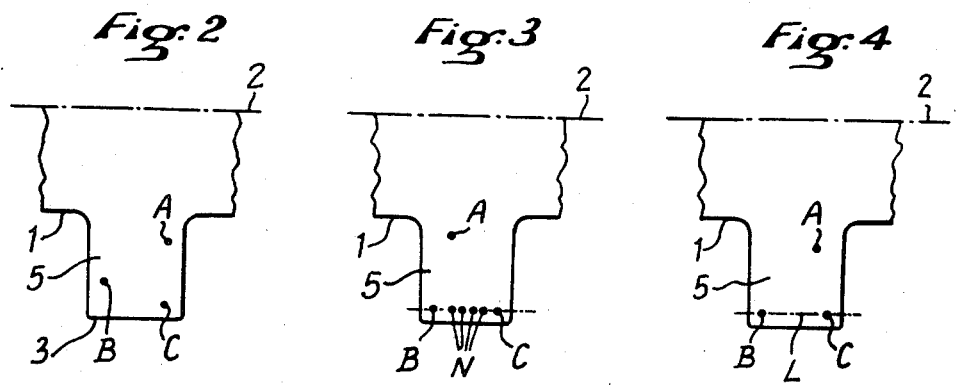
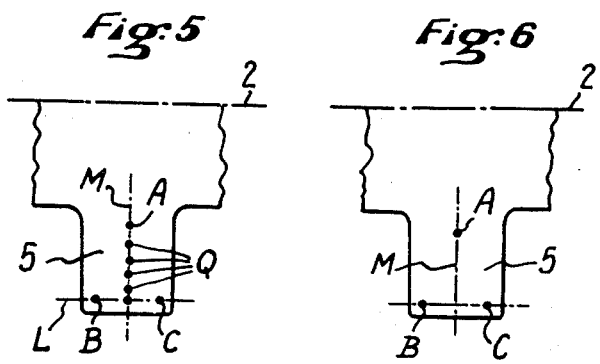

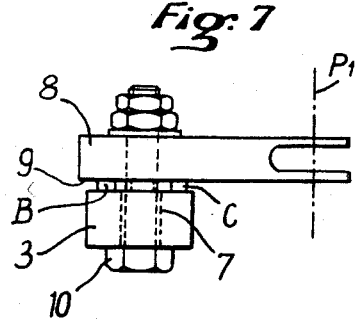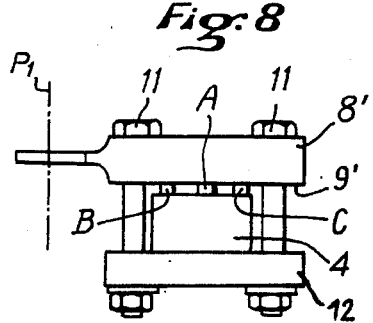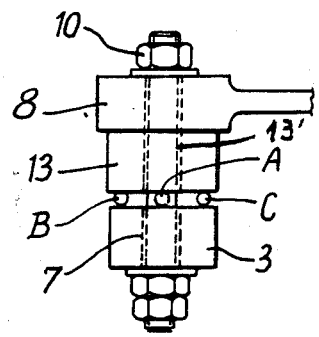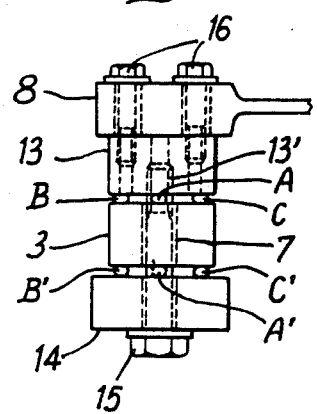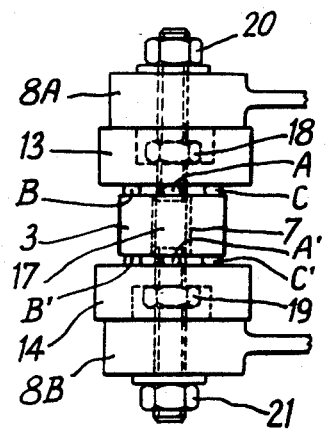

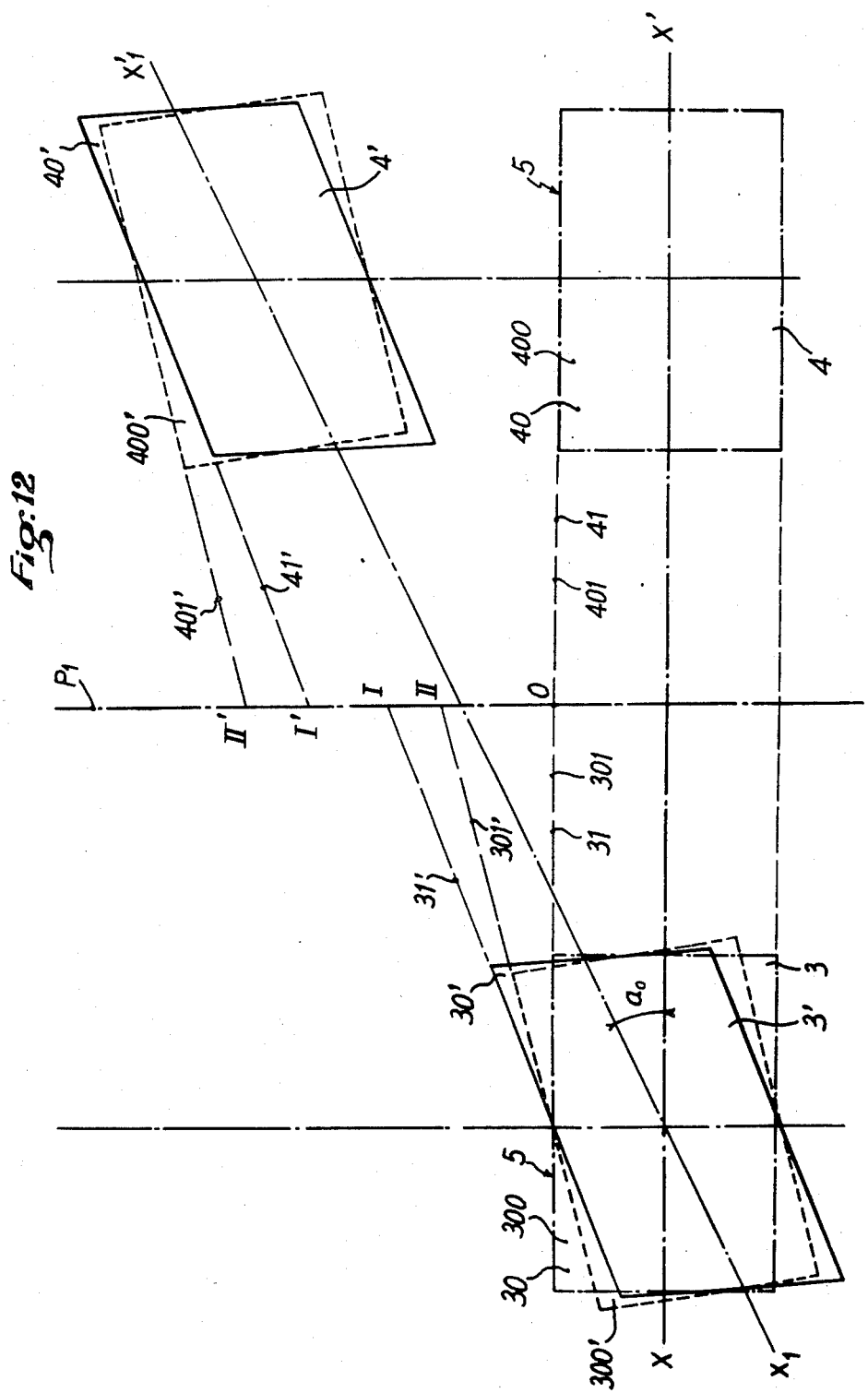

DEVICE FOR MOUNTING A RELATIVE DISPLACEMENT SENSOR ON A BEAM HAVING RADIAL LUGS

The invention relates to a device for mounting a sensor for measuring at least one component of the shear force supported by a loaded beam which is provided with radial lugs for fixing the measuring sensor.

BACKGROUND OF THE INVENTION

The invention is applicable to any loaded beam for which a defined component of the shear force to which the beam is subjected is to be established, and it is particularly advantageous for use in aeronautics. It is important to be able to measure the weight of an aircraft with an error of less than 1%. This can be done by using sensors capable of measuring the vertical shear force exerted on an axle or a wheel lever in the aircraft undercarriage, since both axles and wheel levers are substantially horizontal beams having one end connected to the aircraft structure and having the other end connected to one or more wheels.

For measurement purposes, such a beam has a pair of lugs projecting substantially horizontally from one of its sides when in the measurement position, with said lugs being separated by a predetermined distance in the longitudinal direction of the beam. The opposite side of the beam has a second pair of lugs disposed symmetrically to the lugs of the first pair about an axial plane of symmetry. Each lug is an integral portion of the beam: it projects transversely from the beam and has a rectangular right cross-section with top and bottom plane faces. These two faces are parallel on any one lug and they are situated in planes extending parallel to the axis of the beam and perpendicular to the direction of the shear force to be measured. In addition, they each have a central hole passing therethrough for mounting the measurement sensor. Because of the deformation due to the couple about the axis of the beam, it is generally necessary to use two sensors mounted on two pairs of lugs on opposite sides of the beam in order to be able to calculate the shear force, and consequently to be able to determine the weight of the aircraft. A single sensor and a single pair of lugs suffice when the couple about the beam axis is negligible.

Heretofore, each sensor (or each intermediate support between a sensor and a lug) has included a base with a plane face which is pressed against the major portion of the bearing face of a lug (generally the top face), by means of a bolt passing through the hole provided for the purpose.

U.S. Pat. No. 4,269,070 shows one example of this method of sensor mounting, and describes a type of displacement sensor suitable for performing measurements of this type.

The present invention does not require a particular type of sensor to be used, in other words the sensor used may be inductive, capacitive, optical, piezo resistive, etc. . . , however, when sensor fixing bases are connected to lugs by means of a fixing device in accordance with the present invention, useful measurements can only be obtained if the sensor measuring axis is properly positioned, for example as defined in the above-mentioned US patent.

The main aim of the present invention, in comparison with conventional devices, is to simultaneously increase the measured displacement and the accuracy with which this displacement is measured for a given amount of beam deformation.

SUMMARY OF THE INVENTION

The present invention provides a device for mounting relative displacement sensors on a beam having a longitudinal axis and two transversely-extending lugs which are spaced apart and aligned in said axis direction, each lug having two opposite faces which are mutually parallel and parallel to said axis, said faces being intended for use in mounting sensors having respective mounting bases on respective lug bearing faces, the invention including the improvement whereby the device comprises three non-aligned contact studs interposed between each bearing face of a sensor and the corresponding bearing face of a lug, with one of said studs being closer to the beam than the other two studs.

Preferably, the closest stud to the beam axis is situated on a first straight line which is preferably perpendicular to the general direction of the beam and which constitutes an axis of symmetry for the corresponding lug face. Additional contact studs may be provided along said line.

Also preferably, the two studs which are furthest from the beam lie on a second line which extends parallel to the general direction of the beam, and additional contact studs may also be provided along said second straight line.

In a preferred implementation of the invention, the contact studs are in contact with the face of the lug at a single point close to the beam and lying on said first straight line and at two points which are distant from the beam and which lie on said second straight line.

An intermediate bearing sole plate may be interposed between the sensor and the lug, said sole plate then being put into contact with the face of the lug by means of the above-defined studs.

The contact studs may be constituted by integral portions of the sensor or sensor base or of the intermediate sole plate or of the lug. It is also possible for the contact studs to be removable and to be interposed solely when the sensor or the sole plate is mounted on the mounting face of the lug. In this case, it is preferable to provide recesses for positioning the contact studs.

The term "stud" is used herein to designate a bearing element comprising a contact zone whose area is small, but large enough to withstand the exerted clamping force given the strength of the materials used. Such a contact zone may include a plurality of projections close to one another with the set of these projections constituting a single "stud" in accordance with the invention.

Advantageously, the studs have a convex surface and may be constituted, for example, by balls or hemispherical projections.

BRIEF DESCRIPTION OF THE DRAWINGS

Embodiments of the invention are described by way of example with reference to the accompanying drawings, in which:

FIG. 1 is a fragmentary perspective view of an existing beam having two lugs on one side for mounting two associated sensor components;

FIGS. 2 to 6 are plan views of a lug face on which various different possible contact stud positions in accordance with the invention are shown;

FIGS. 7 to 11 are elevation views showing various embodiments of a mounting for connecting one or two sensor components to a lug by means of contact studs in accordance with the invention;

FIG. 12 is a diagram representing the right cross-section of two lugs on a beam and showing how said right cross-section deforms when the beam is itself deformed by a shear force.

MORE DETAILED DESCRIPTION

In FIG. 1, a beam 1 having a geometrical axis 2 is provided, in conventional manner, with two radially-extending transverse lugs 3 and 4 each intended to receive a respective component (not shown) of a measurement sensor sensitive to the deformation to which said beam 1 is subjected under the effect of a shear force. Each of these two lugs has a top face 5 and a bottom face 6, which faces are mutually parallel and are parallel to the axis 2. Each of the lugs 3 and 4 has a hole 7 passing therethrough for receiving a bolt for use in mounting a sensor component to the lug.

FIGS. 2 to 6 show the top face 5 of one of the lugs 3 or 4, with the hole 7 being omitted.

In accordance with the invention, a sensor component is mounted on each lug 3 or 4 via contact studs which are represented by points A, B, and C. Of these three studs, the stud A is closest to the beam 1 and the other two studs B and C are spaced apart and further away from the beam 1. The three studs are not aligned. Preferably, the stud A is chosen to lie on a first straight line M (drawn in FIGS. 5 and 6) which extends perpendicularly to the general direction of the beam 1 and its axis 2. The studs B and C lie on a second straight line L which is shown in dot-dashed lines in FIGS. 3 to 6, and which extends parallel to the general direction of the beam 1 and its axis 2. The studs B and C are preferably symmetrically disposed about the first straight line M.

FIGS. 3 and 5 show that it is possible, in a variant and if so desired, to provide additional contact studs N or Q which lie respectively on the second straight line L (see FIG. 3) or on the first straight line M (see FIG. 5) providing said first straight line M is an axis of symmetry of the lug face. The stud designated as A could be a stud placed at any point on the lug 5 (see FIGS. 2 to 4), but it is preferable for the stud A to be situated on a straight line M lying on the axis of symmetry of the lug 5. On each of the lines L and M, additional studs may touch one another and form a continuous line, but there is no additional advantage in providing such contiguous studs. FIGS. 7 and 8 show two lugs 3 and 4 carrying respective bases 8 and 8' of a displacement sensor. Each base has a bearing face 9 or 9' and it is fixed to the corresponding lug by means of at least one bolt. In FIG. 7, a single bolt 10 passes through the sensor component 8 and the lug 3 via the hole 7 through the lug. In FIG. 8, two bolts 11 pass through the sensor component 8' on either side of the lug 4. The sensor component is fixed by means of a strap 12. In either case, contact studs A, B, C are interposed between the bearing faces 9 and 9' and the corresponding faces of the lugs 3 and 4.

FIG. 9 shows an example of a sensor element 8 mounted on a lug 3 with an intermediate sole plate 13 interposed between the lug and the sensor component. The intermediate sole plate 13 has a hole 13'. Studs A, B, C are placed between the sole plate 13 and the lug 3. Clamping is provided by means of a bolt 10 which passes through the hole 7 of the lug, the hole 13' of the intermediate plate 13 and through the component 8.

FIG. 10 shows an intermediate sole plate 13 mounted on one face of a lug 3 by means of a backing plate 14 placed on the opposite side of the lug. Studs A, B, C, and A', B', C', are disposed in corresponding positions between the opposite faces of the lug 3 and the sole plate 13 or the backing plate 14 as the case may be. This assembly is held together by a screw 15 passing through the backing plate 14 and the lug 3 via the hole 7 therethrough and which is screwed into a tapped hole 13' in the sole plate 13. The sensor component 8 is fixed to the sole plate 13 by means of screws 16 which screw into the sole plate 13.

FIG. 11 shows two intermediate sole plates 13 and 14 which are clamped to opposite faces of a single lug 3 by means of a bolt 17 passing through the hole 7 in the lug. The head 18 and the nut 19 of the bolt 17 are hidden in suitable recesses provided in the two sole plates 13 and 14. Thus, two sensor components 8A and 8B are fixed by means of nuts 20 and 21 to corresponding sole plates 13 and 14 independently of each other. Studs A, B, C and A', B', C' are interposed in corresponding positions between each of the sole plates 13 and 14 and the corresponding face of the lug 3.

The studs A, B, & C may be in the form of add-on pegs (FIG. 7) or pegs incorporated in the sole plates (10), or add-on balls (FIG. 9).

Recesses may be provided in the sensor components or in the sole plates or in the lugs for partially receiving the studs A, B, and C when the studs are add-on studs.

The mounting device in accordance with the invention has advantages which are explained below with reference to FIG. 12.

FIG. 12 shows the deformation of a pair of lugs under the effect of beam shear perpendicularly to the bearing faces of the lugs and the beam axis.

The beam bending effect which normally accompanies the application of a shear force has not been shown, in order to simplify the diagram.

FIG. 12 shows two lugs 3 and 4 whose cross-sections are rectangular in the absence of a force being applied to the beam. Since the lugs 3 and 4 extend perpendicularly to the projection plane and to the plane of symmetry of the beam, they are represented by rectangles in the figure which are drawn in dot-dashed lines and spaced apart along the beam axis direction.

The top faces 5 of the lugs 3 and 4 lie in the same plane in the absence of an applied force.

Reference 30 designates a right cross-section of the lug 3 close to the beam, and reference 300 designates a right cross-section of the same lug 3 but taken further away from the beam.

Reference 40 designates a right cross-section of the lug 4 close to the beam, and reference 400 designates a right cross-section of the same lug 4 taken further away from the beam.

In the absence of an applied force on the beam, the projections of the cross-sections 30 and 300 are the same and correspond to the dot-dashed rectangle representative of the lug 3. Similarly the projections 40 and 400 are the same and correspond to the dot-dashed rectangle representing the lug 4.

When the beam is deformed by a shear force, the two lugs move relative to each other in planes transverse to the beam, and in so doing they are themselves deformed. Assuming, for the sake of simplicity, that the center of the lug 3 does not move, the new shapes and positions 30' and 40' of the right cross-sections 30 and 40 of the two lugs are drawn in solid lines, while the new shapes and positions 300' and 400' of the right cross-sections 300 and 400 of the two lugs are drawn in dashed lines. These lines show that the top and bottom faces of the lugs which are used for fixing the sensors are no longer plane, but are twisted (and such twisting also occurs on their side faces). As a result, when a sensor is fixed by thrusting a plane face against one of the faces of a lug, in a conventional manner, the thrust is insufficient and slipping is possible, and this gives rise to inaccuracies in measurement.

Reference P1 designates the plane situated between the lugs and extending perpendicularly to the neutral axis of the beam; which plane contains the measurement axis of the sensor (see FIGS. 7, 8, and 12). On FIG. 12, straight lines 31 and 41 run along the top faces of the lugs at the crosssections which are closer to the beam.

When no force is applied to the beam, the straight lines 31 and 41 are colinear and intersect the plane P1 at O.

When a shear force is applied then straight lines 31 and 41 become lines 31' and 41' which are offset relative to each other and which intersect the plane P1 at I and I'.

Similarly, straight lines 301 and 401 running along the top faces of the lugs at their more distant cross-sections from the beam are also shown in FIG. 12 and they are colinear when no force is applied and they intersect the plane P1 at O. However, when a shear force is applied, these lines shift to become 301' and 401' and they then intersect the plane P1 at II and II'.

It is clear that when the two relatively movable components of the sensors are driven essentially by two points each on the straight lines 301 and 401, the magnitude of the deflected signal is proportional to the distance II, II'. This distance is greater than the distance which occurs when the relatively movable portions are essentially driven by points lying along the lines 31 and 41, in which case the signal is proportional to the distance I, I'.

When the two relatively movable components are essentially driven from three points (A,B,C) on each lug face, with the three points forming a triangle and with the point A being closer to the beam than the points B and C, the resulting signal increases with increasing distance of the points B and C from the beam.

This explanation relating to elastic deformation of the lugs shows that although the bearing faces twist, transmitting the motion of a lug via three points A, B, C ensures that the transmission is always in a plane and is therefore stable and accurate. It also shows that the useful signal detected by the displacement sensor is increased by having the points B and C further away from the beam than the point A.

A device in accordance with the invention also provides the following advantages:

in FIG. 10, it can be seen that the sensor base 8 may be disassembled by merely undoing the screws 16 and without disassembling the sole plate 13. This method of fixing makes it possible to replace a faulty sensor without upsetting the positioning of the studs A, B, C, and Q or N, if any;

in FIG. 11, the base 8A of a sensor may be disassembled by removing the nut 20 without disassembling or moving the base 8B of the other sensor which is held by the nut 21;

similarly the base 8B may be disassembled independently from the base 8A of the other sensor; and the bases 8A and 8B can be fixed to the sole plates 13 and 14 independently from each other by other conventional assembly means (screw, bolts, etc. . . ), for example, by means of screws 16 as shown in FIG. 10.

Consequently, it should be understood that the term "independent assembly means" is used herein for any means enabling the sensor bases to be fixed to the corresponding sole plates and removed therefrom without ill effect on the stability with which any other sensors may be fixed to the same lugs. These assembly means may include components which are common to the means situated on the opposite side of a lug, for example threaded rods 17 as shown in FIG. 11.

It is necessary for the resultant of the forces provided by the assembly means to pass inside the triangle A, B, and C and preferably close to the center of gravity of the triangle so that each of the studs A, B, C, and Q or N if any, is kept in contact in order to transmit the desired motion.

Finally, it should be observed that if the points A', B' and C' are placed "opposite" the points A, B, and C, as shown in FIGS. 10 and 11, so as to ensure that the natural deformation of the lugs 3 or 4 is not opposed by the clamping effect, then the full useful displacement of the II, II' type is retained, as shown in FIG. 12 for the positioning of points A, B, C.

It is desirable, but not essential, for a mounting to include studs A, B, C, and optionally Q and/or N for both lugs and both bases of a given sensor. Similarly, it is possible to use one variant of the invention for fixing a sensor to one lug and a different variant for fixing it to the other lug.

I claim:

1. A device for mounting relative displacement sensors on a beam having a longitudinal axis and two transversely-extending lugs which are spaced apart and aligned in said longitudinal axis direction, each said lug having two opposite faces which are mutually parallel and parallel to said longitudinal axis, said faces being intended for use in mounting sensors having respective mounting bases on said faces, wherein said device comprises:

three non-aligned contact studs interposed between each bearing face of a sensor and the corresponding face of a lug, with one of said studs being closer to the beam than the other two studs.

2. A device according to claim 1, wherein the closest stud to the axis is situated on a first straight line extending perpendicularly to the axis of the beam and is substantially colinear with the axis of symmetry of the face of the lug.

3. A device according to claim 2, wherein the two studs furthest from the axis are situated on a second straight line extending parallel to the axis.

4. A device according to claim 3, wherein additional contact studs are disposed along said second straight line.

5. A device according to claim 3, including at least one sole plate disposed between one of said lug faces and the face of a sensor face, said studs being disposed between said sole plate and the corresponding lug face.

6. A device according to claim 5, wherein the two studs furthest from the axis are situated on a second straight line extending parallel to the axis.

7. A device according to claim 2, wherein additional contact studs are provided along said first straight line.

8. A device according to claim 1, wherein the two studs furthest from the axis are situated on a second straight line extending parallel to the axis.

9. A device according to claim 8, wherein additional contact studs are disposed along said second straight line.

10. A device according to claim 1, including at least one sole plate disposed between one of the lug faces and the face of a sensor face, said studs being disposed between said sole plate and the corresponding lug face.

11. A device according to claim 10, including independent assembly means for fixing mounting bases of said sensors on the corresponding lugs by means of sole plates mounted on said lugs where the contact studs directly contact said lugs.

12. A device according to claim 10, wherein the studs are an integral part of the sole plate.

13. A device according to claim 10, including, for at least one of said lugs, two sole plates and a first set of assembly means fixing said sole plates to respective opposite faces of said lug via studs, and a second set of assembly means fixing a first relative displacement sensor to one of said sole plate.

14. A device according to claim 13, further including a third set of assembly means fixing a second relatively displacement sensor to the other one of said sole plates.

15. A device according to claim 1, wherein the studs are an integral part of the lugs.

16. A device according to claim 1, wherein the studs are an integral part of the sensor base.

* * * * *